(12) United States Patent
Uhler et al.

(10) Patent No.: US 8,393,863 B2
(45) Date of Patent: Mar. 12, 2013

(54) TORQUE CONVERTER CLOSURE TABS

(75) Inventors: Adam Uhler, Sterling, OH (US); Todd J. Sturgin, Shreve, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1535 days.

(21) Appl. No.: 11/897,496

(22) Filed: Aug. 30, 2007

(65) Prior Publication Data

US 2008/0053773 A1   Mar. 6, 2008

Related U.S. Application Data

(60) Provisional application No. 60/842,183, filed on Sep. 1, 2006.

(51) Int. Cl.
*F16D 33/18* (2006.01)

(52) U.S. Cl. ............. 416/1; 416/197 C; 29/513; 29/889; 29/889.5; 403/242

(58) Field of Classification Search ............... 415/214.1, 415/215.1; 416/1, 180, 197 C, 204 R, 212 R, 416/213 A, 183; 60/330, 366; 29/513, 889, 29/889.5, 889.7; 403/242
See application file for complete search history.

(56) References Cited

U.S. PATENT DOCUMENTS

| | | | | |
|---|---|---|---|---|
| 913,685 A | * | 3/1909 | Boyd | 29/513 |
| 2,505,820 A | * | 5/1950 | Zeidler | 416/180 |
| 2,748,715 A | * | 6/1956 | Mamo | 60/361 |
| 2,784,675 A | * | 3/1957 | Farrell | 60/362 |
| 2,917,001 A | * | 12/1959 | Zeidler et al. | 416/180 |
| 3,138,107 A | * | 6/1964 | Zeidler | 60/361 |
| 3,981,614 A | * | 9/1976 | Helmer | 416/180 |
| 4,867,641 A | | 9/1989 | Okuno et al. | |
| 5,271,716 A | * | 12/1993 | Ejiri | 416/180 |
| 5,333,500 A | * | 8/1994 | O'Daniel | 29/889.5 |
| 5,388,678 A | | 2/1995 | Murata | |
| 6,082,446 A | * | 7/2000 | Ahaus et al. | 165/173 |
| 6,953,112 B2 | | 10/2005 | Miura | |
| 7,040,469 B2 | | 5/2006 | Shirataki et al. | |
| 2004/0112699 A1 | | 6/2004 | Prater et al. | |
| 2007/0048082 A1 | | 3/2007 | Hoffmann et al. | |
| 2007/0224046 A1 | | 9/2007 | Wang et al. | |

FOREIGN PATENT DOCUMENTS

DE   19755168   6/1999

* cited by examiner

*Primary Examiner* — Christopher Verdier
(74) *Attorney, Agent, or Firm* — Simpson & Simpson, PLLC (57) ABSTRACT

A torque converter including a cover with at least one slot located about a periphery and a pump with at least one protrusion located about a periphery of the pump. The protrusion extends axially through the slot and is bent radially about the slot to join the cover and the pump. In some aspects, the converter includes a sealing element disposed between the cover and the pump and the sealing element is selected from the group consisting of an o-ring and a gasket. A method of transferring torque including: inserting at least one peripherally disposed protrusion for one of a pump and cover of a torque converter through at least one peripherally disposed opening in the other of the pump and cover, radially bending the protrusion to clamp the cover and pump, and transmitting torque from the cover to the pump through the protrusion.

16 Claims, 13 Drawing Sheets

Prior Art

FIG. 1

Prior Art

FIG. 2

Prior Art

FIG. 3

Prior Art

TORQUE CONVERTER CLOSURE TABS

CROSS-REFERENCE TO RELATED APPLICATIONS

This application claims the benefit under 35 U.S.C. §119 (e) of U.S. Provisional Application No. 60/842,183 filed Sep. 1, 2006.

FIELD OF THE INVENTION

The present invention relates to improvements in apparatus for transmitting force between a rotary driving unit (such as the engine of a motor vehicle) and a rotary driven unit (such as a variable-speed transmission in the motor vehicle). In particular, the present invention relates to a torque converter with a cover and pump shell joined by slots and tabs.

BACKGROUND OF THE INVENTION

Figure 1:
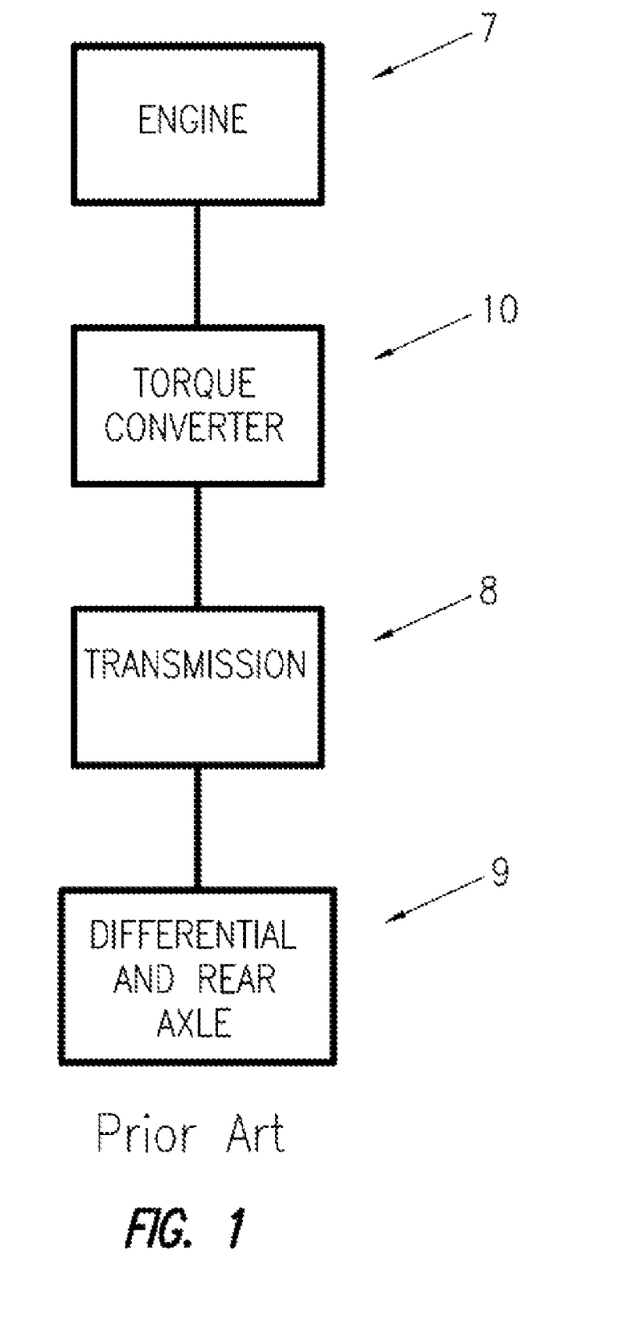
FIG. 1 is a general block diagram illustration of power flow in a motor vehicle, intended to help explain the relationship and function of a torque converter in the drive train thereof.

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation. Elements 21 are rivets; elements 23 are turbine blades; elements 24 and 32 are torus rings; element 25 is a stator; element 26 is race; elements 27 are bearings; element 28 is a race; element 29 is an end plate; elements 33 are pump blades; element 34 is a pump shell; element 35 is a hub; and element 36 is a bushing.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs to be redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

Figure 2:
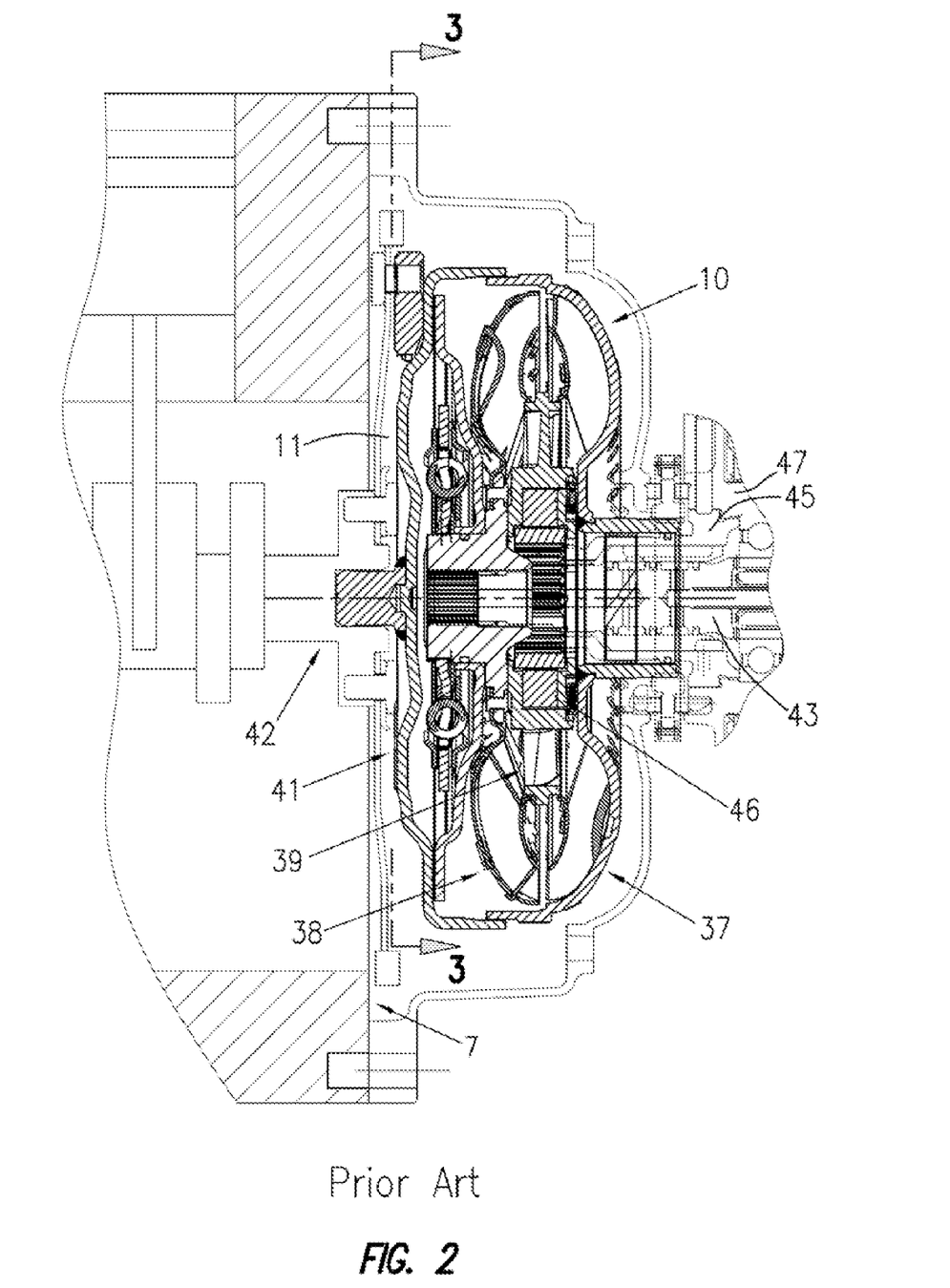
FIG. 2 is a cross-sectional view of a prior art torque converter, shown secured to an engine of a motor vehicle.
Figure 3:
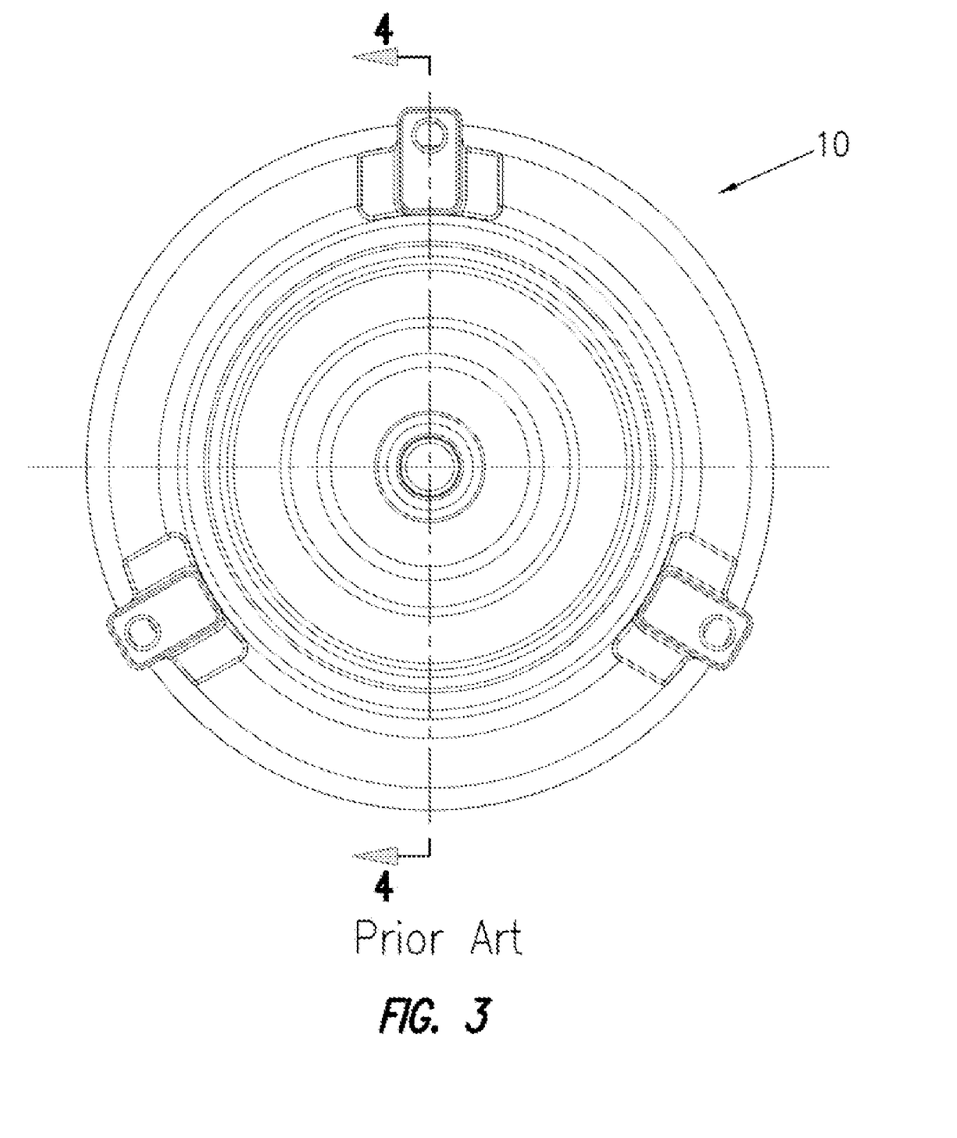
FIG. 3 is a left view of the torque converter shown in FIG. 2, taken generally along line 3-3 in FIG. 2.
Figure 4:
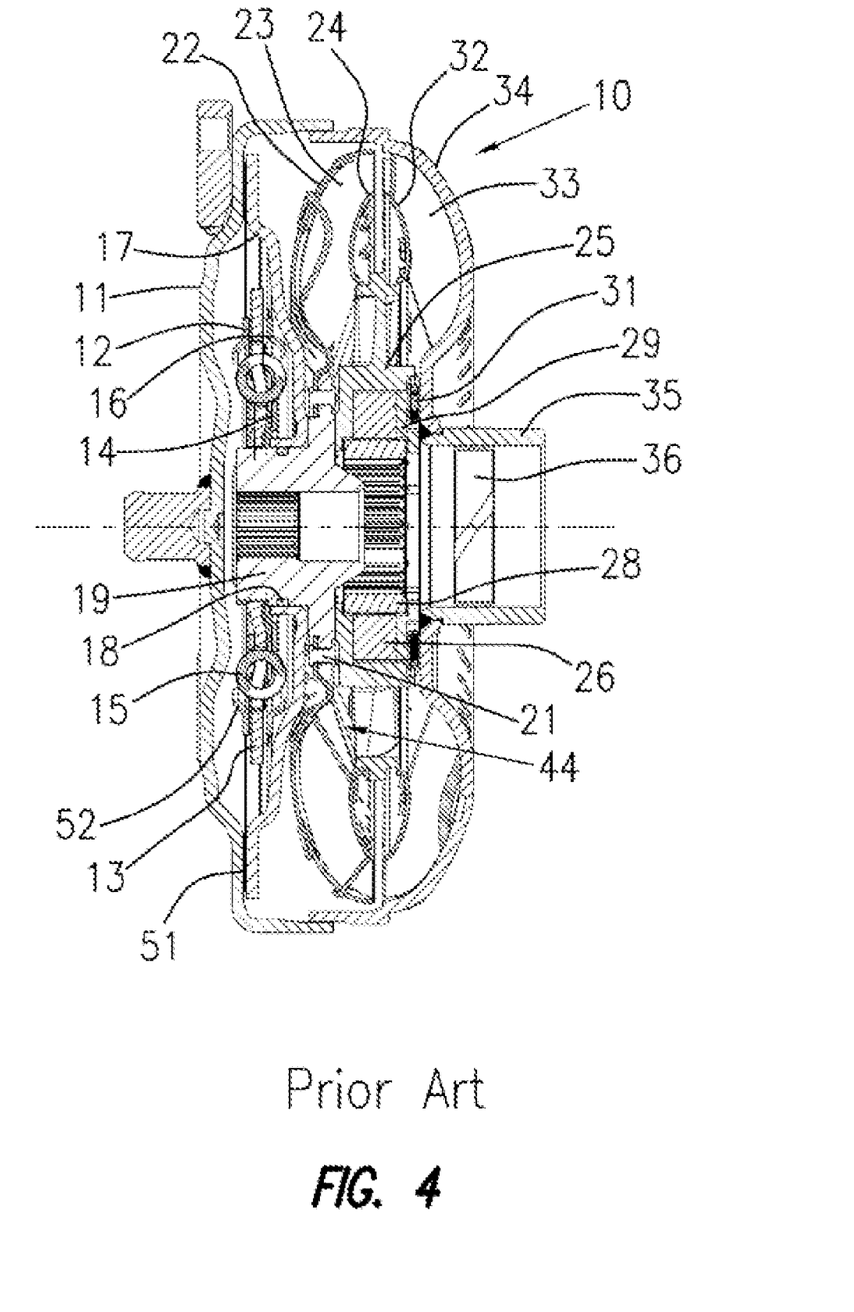
FIG. 4 is a cross-sectional view of the torque converter shown in FIGS. 2 and 3, taken generally along line 4-4 in FIG. 3.
Figure 5:
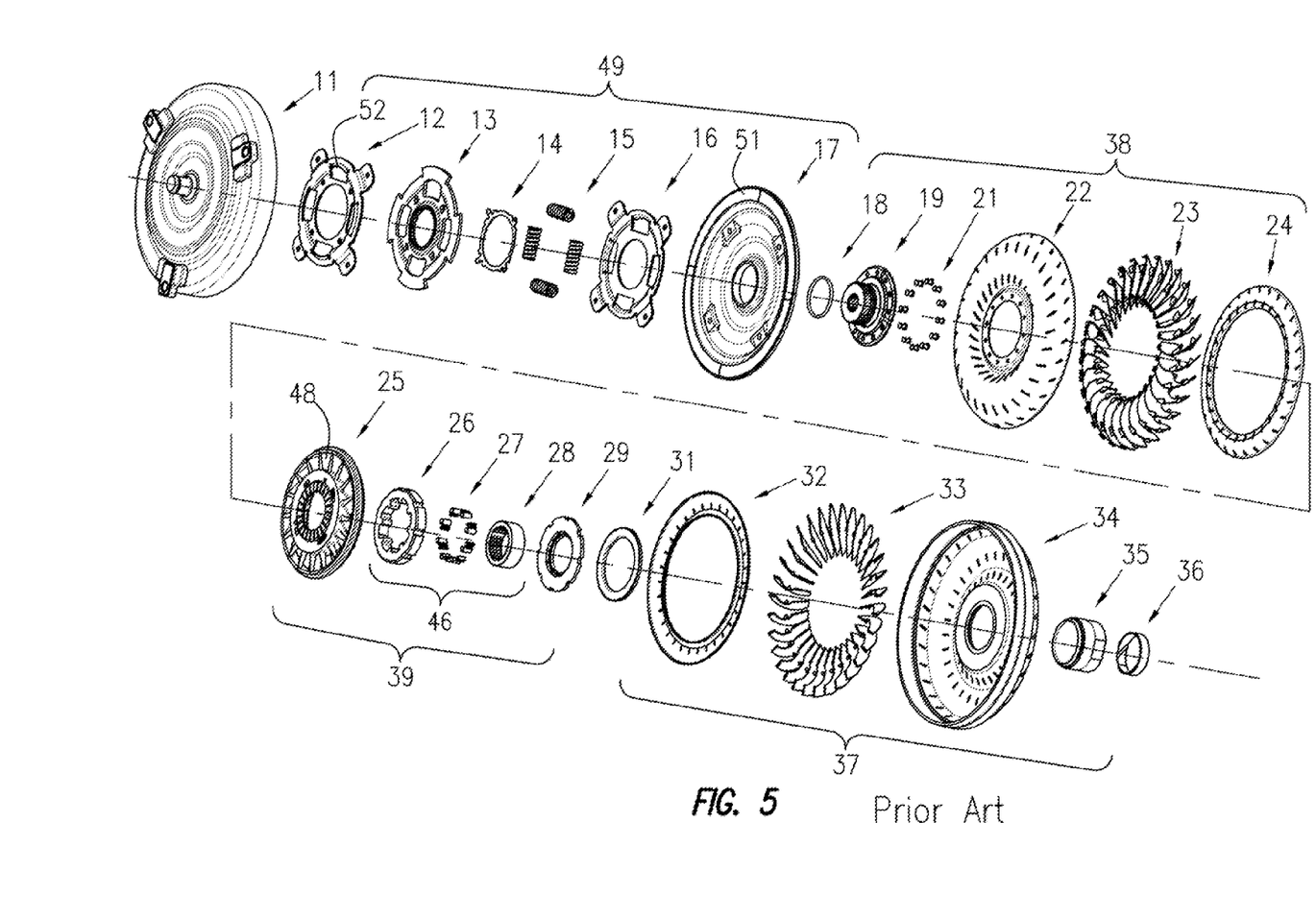
FIG. 5 is a first exploded view of the torque converter shown in FIG. 2, as shown from the perspective of one viewing the exploded torque converter from the left.
Figure 6:
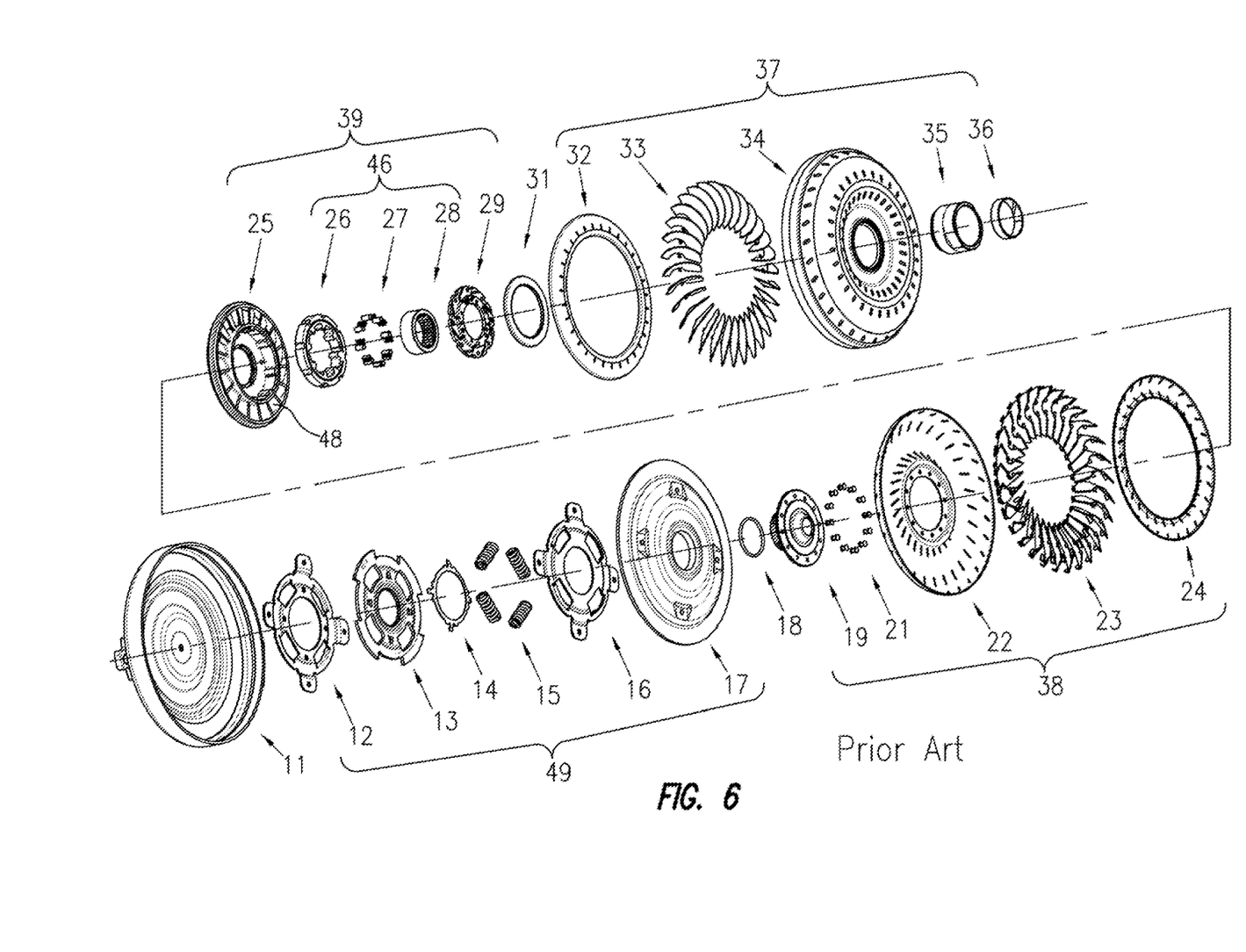
FIG. 6 is a second exploded view of the torque converter shown in FIG. 2, as shown from the perspective of one viewing the exploded torque converter from the right.

Referring to FIG. 2, torque converter 10 includes pump 37 and cover 41. In some cases, the cover and pump are comprised of low carbon steel and formed by a stamping process. Lugs 14 and pilot 15 are welded to the cover. The cover and pump are sealed by a seam weld at 13. Torque from the engine of a motor vehicle is transferred to the cover through lugs 14. The torque is then transferred to the pump through the weld connecting the cover and the pump.

Stamping the cover and pump are costly and time consuming processes requiring multiple steps. In addition, the steps of welding lugs 14 and pilot 15 are expensive, time consuming, and potentially create contamination. Finally, the seam welding process used to join pump 37 and cover 41 is unstable and creates contamination on the inside of the torque converter.

Thus, there is a long-felt need for a torque converter that is easily manufactured without seam welding. Further, there is a long-felt need for a simplified cover that can be simply attached to a pump.

BRIEF SUMMARY OF THE INVENTION

The present invention broadly comprises a torque converter including one of a pump or cover with at least one slot located about a periphery of the one of the pump or cover. The other of the pump or cover includes at least one protrusion located about a periphery of the other of the pump or cover and extending axially through the at least one slot to fasten the pump to the cover. In some aspects, the one of the pump or cover includes an outer surface and an annular radial protrusion disposed about the outer surface proximate the periphery. The slots are disposed in the radial protrusion. In some aspects, the annular radial protrusion is integrally formed with the one of the pump or cover or the annular radial protrusion is formed separately from the one of the pump or cover and fixedly connected to the one of the pump or cover. In some aspects, the torque converter includes a sealing element disposed between the cover and the pump and the sealing element is an o-ring or a gasket. In some aspects, the at least one protrusion is bent radially to clamp the pump and cover. In some aspects, the torque converter includes a ring peripherally located about the one of the pump or cover or an L-ring peripherally located about the other of the pump or cover. In some aspects, the ring or L-ring are in contact with the protrusions.

In some aspects, the pump is made of low carbon steel or is formed by a stamping process. In some aspects, the cover is cast from a steel alloy, cast iron, or aluminum. In some aspects, the cover is formed stamping. In some aspects, the cover comprises at least one lug integral to the cover and at least one pilot integral to the cover.

The present invention also broadly comprises a method for transferring torque from a drive unit. The method inserts at least one peripherally disposed protrusion for one of a pump or cover of a torque converter through at least one peripherally disposed opening in the other of the pump or cover, bends the at least one protrusion to clamp the cover and the pump, and transfers torque from the cover to the pump through the at least one protrusion.

The present invention further broadly comprises a method for sealing a torque converter. The method inserts at least one peripherally disposed protrusion for one of a pump or cover for a torque converter through at least one peripherally disposed opening in the other of the pump or cover, disposes a seal between the cover and the pump, and radially bends the at least one protrusion to compress the cover and the pump against the seal element.

The present invention broadly comprises a method of modifying torque converter balance. The method inserts at least one peripherally disposed protrusion for one of a pump or cover for a torque converter through at least one opening in a peripherally disposed ring for the other of the pump or cover, radially bends the at least one protrusion to clamp the cover and the pump, and removes material from an outside of the ring as needed to balance the torque converter.

The present invention also broadly comprises a torque converter having a cast cover with at least one slot located about a periphery of the cover, at least one integral lug, and an integral pilot. The converter also includes a stamped pump with at least one protrusion located about a periphery of the pump and a sealing element disposed between the cover and the pump. The at least one protrusion extends axially through the at least one slot and is radially bent to clamp the pump to the cover and to create a seal among the sealing element, the cover and the pump.

The present invention further broadly comprises a torque converter including a pump and a cover. The cover includes at least one slot located about a periphery of the cover and the pump includes at least one protrusion located about a periphery of the pump and extending axially through the at least one slot to fasten the cover and pump together.

It is an object of the present invention to provide a torque converter with a cover and pump joined without a seam weld.

These and other objects and advantages of the present invention will be readily appreciable from the following description of the preferred embodiments of the invention and from the accompanying drawings and claims.

BRIEF DESCRIPTION OF DRAWINGS

The nature and mode of operation of the present invention will not be more fully described in the following detailed description of the invention taken with the accompanying drawing figures, in which:

FIG. 12b is a perspective view of the support ring shown in FIG. 12a;

FIG. 13a is a view of section 13a shown in FIG. 11 with a support L-ring added; and, FIG. 13b is a perspective view of the L-ring shown in FIG. 13a.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials, and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7A:
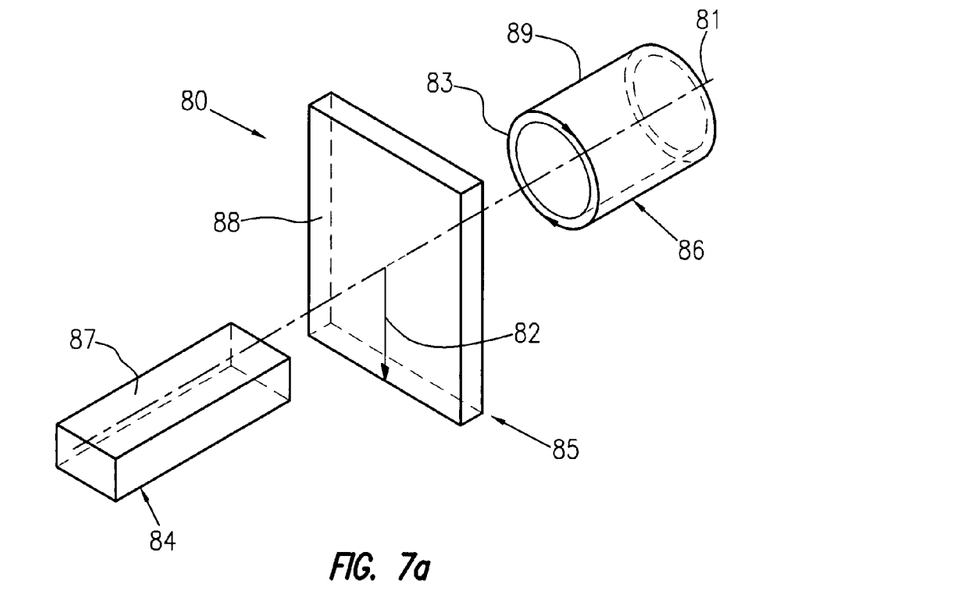
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
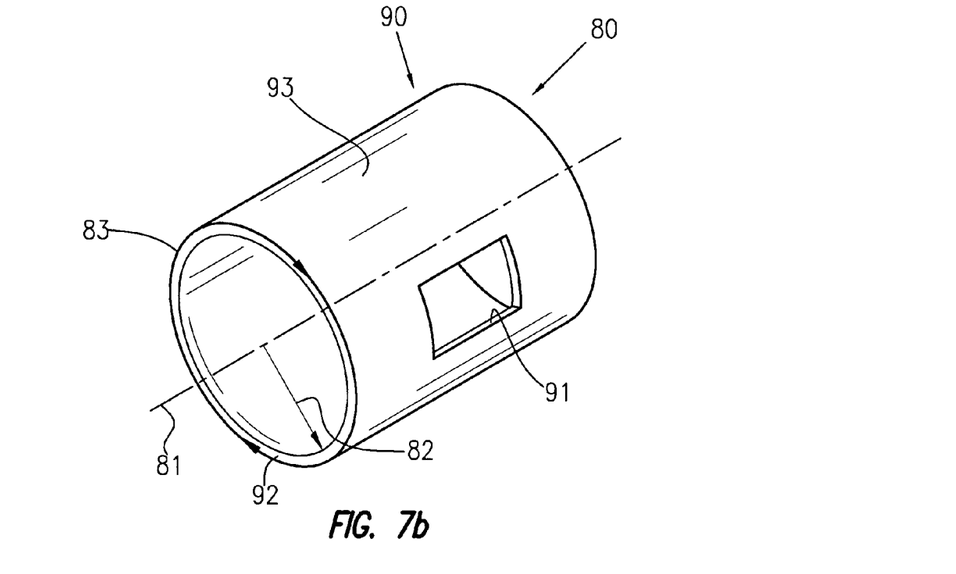
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
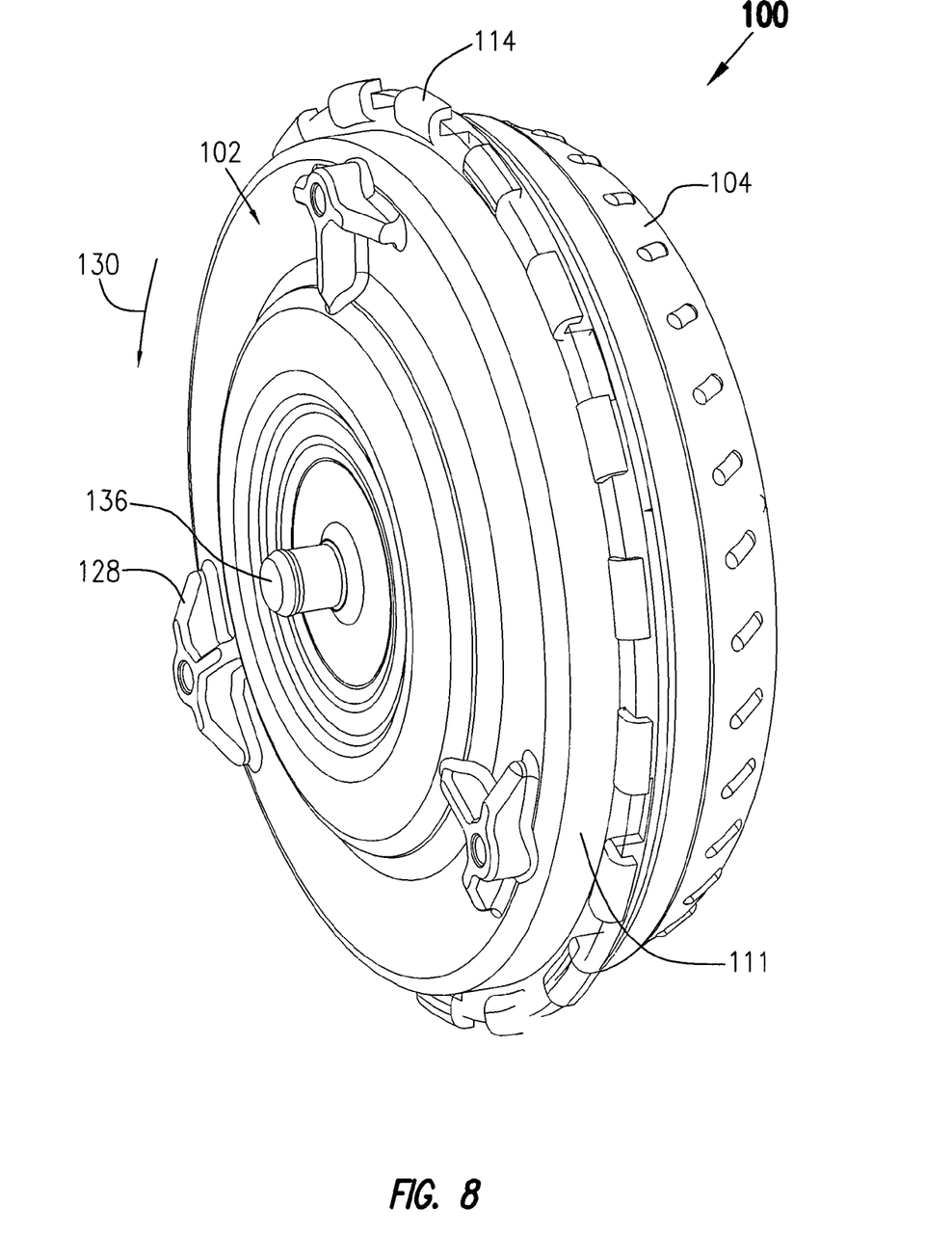
FIG. 8 is a front perspective view of a present invention torque converter.

FIG. 8 is a front perspective view of present invention torque converter 100.

Figure 9:
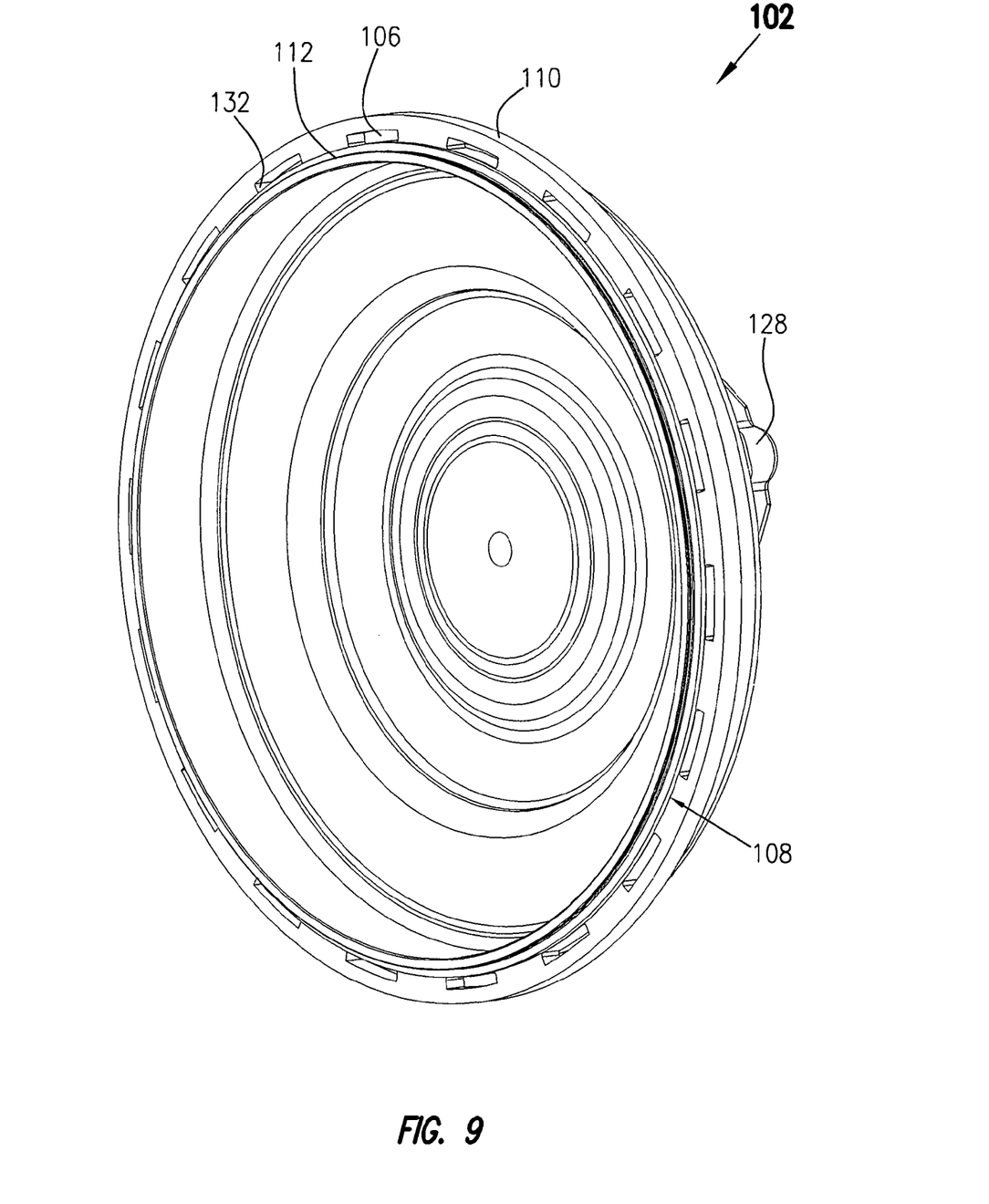
FIG. 9 is a back perspective view of the cover shown in FIG. 8.

FIG. 9 is a back perspective view of cover 102 shown in FIG. 8.

Figure 10:
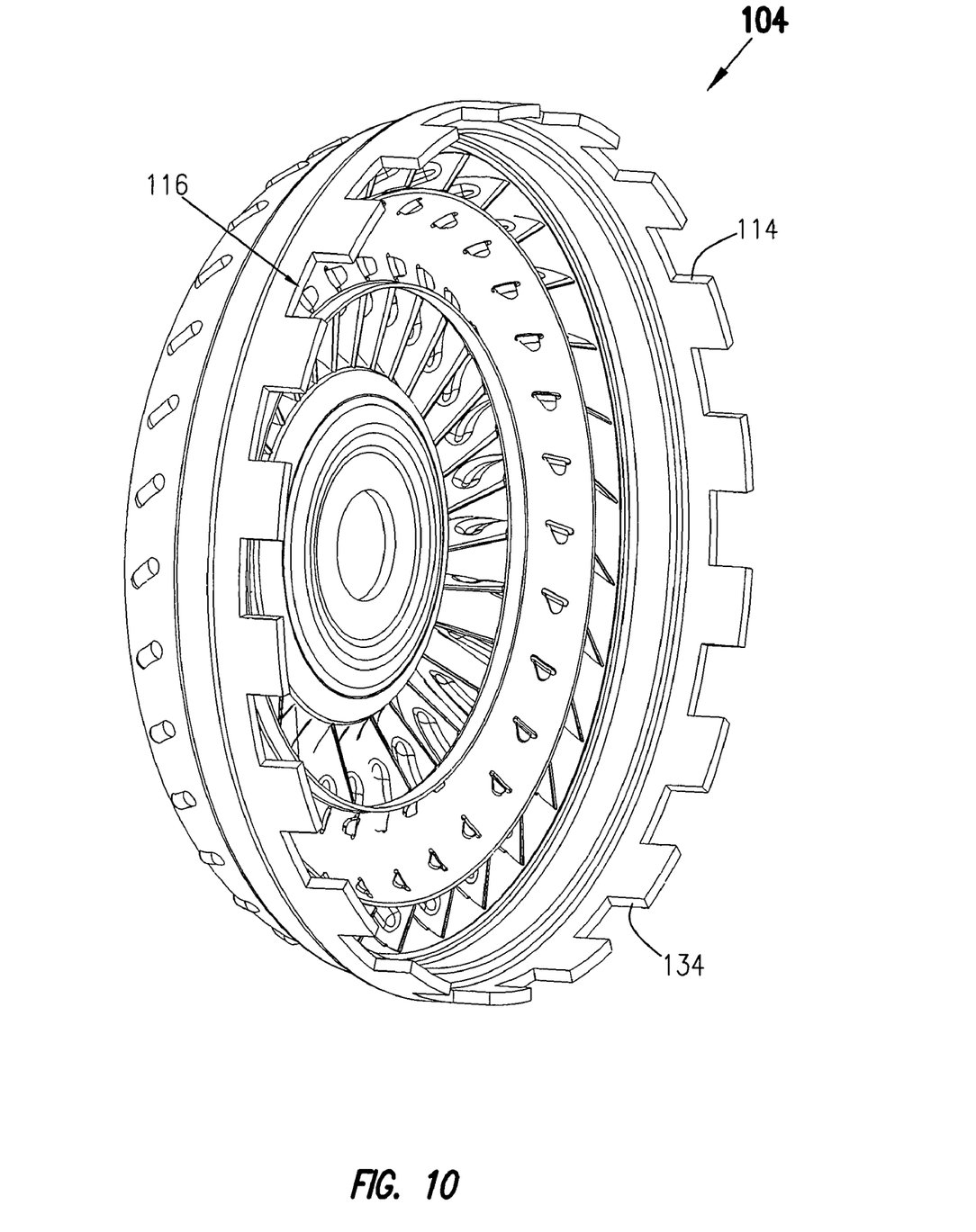
FIG. 10 is a front perspective view of the pump shown in FIG. 8.

FIG. 10 is a front perspective view of pump, or impeller, 104 shown in FIG. 8. The following should be viewed in light of FIGS. 8 through 10. Cover 102 includes slots 106 located about periphery, or edge, 108 of the cover. The slots are formed in annular radial protrusion, or ring, 110, disposed about outer surface 111 of the cover proximate periphery 108. In some aspects, the ring is axially displaced from the edge as shown by extension 112. In some aspects (not shown), the ring is radially aligned with the edge. Pump 104 includes at least one protrusion, or tab, 114 located about periphery, or edge, 116 of the pump. Protrusions 114 extend axially through the slots to fasten the pump to the cover. It should be understood that a present invention torque converter is not limited to the number, size, shape, or configuration of slots and protrusions shown and that other numbers, sizes, shapes, or configurations of slots and protrusions are included in the spirit and scope of the claimed invention.

Figure 11:
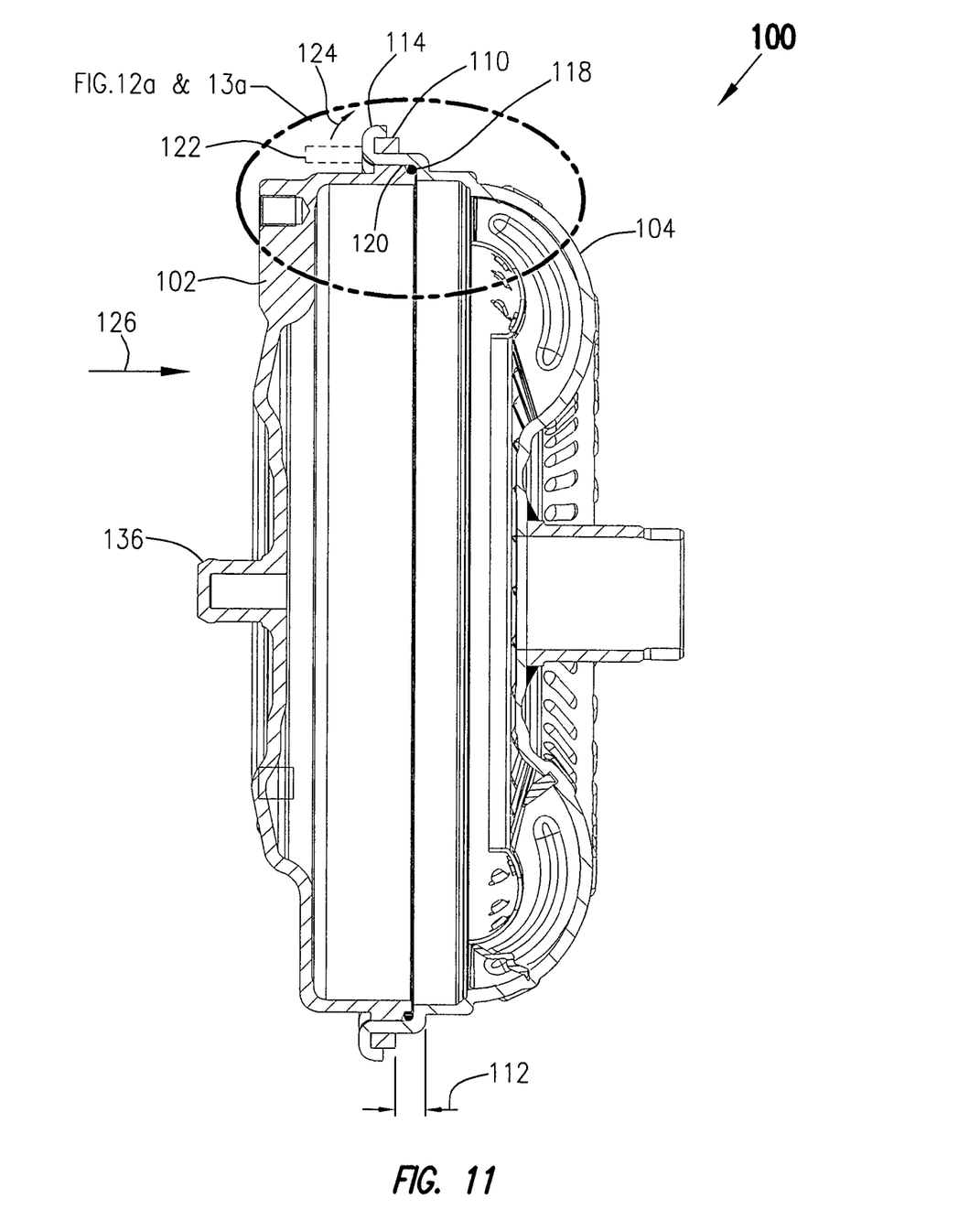
FIG. 11 is a cross-sectional view of the torque converter in FIG. 8 with internal components removed.

FIG. 11 is a cross-sectional view of torque converter 100 in FIG. 8 with internal components removed for clarity. The following should be viewed in light of FIGS. 8 through 11. Torque converter 100 includes sealing element 118 disposed between the cover and the pump. In some aspects, sealing element 118 is located in a space defined by ring 110, extension 112, and tabs 114. Specifically, notch, or indent, 120 is formed in the cover. Any means known in the art can be used for the sealing element, including but not limited to an o-ring or gasket. Sealing element 118 creates a fluid-tight seal between the cover and pump.

To fasten the cover and the pump together, protrusions 114 are radially bent. For example, in an initial stage of assembly, the protrusions extend through the slots and extend axially as shown by dashed lines 122. Then, the tabs are bent in direction 124 to form the configuration shown in the figures. By bending the tabs, axial pressure is applied to ring 110 by the tabs in direction 126, drawing the cover and pump together and compressing sealing element 118 between the cover and pump. Thus, a fluid-tight connection is formed without the use of welding and the attendant difficulties noted supra.

Cover 102 is arranged for connection to an engine (not shown) in a vehicle (not shown), for example, through lugs 128. Torque from the engine is transferred to the cover and in turn, the cover transfers the torque to pump 104 via ring 110.

That is, the circumferential edges of the slots contact the circumferential edges of the tabs to transmit the majority of the torque. For example, for torque transmitted to the cover in direction 130, edges 132 of the slots contact edges 134 of the protrusions. Thus, a torque transfer path is formed between the cover and the pump without the use of welding and the attendant difficulties noted supra.

In some aspects, lugs 128 and pilot 136 are integral to the cover, advantageously eliminating the extra fabrication steps associated with the formation and connection of the lugs and pilot to the cover. In some aspects (not shown), the lugs and pilot are formed separately from the cover and fixedly secured to the cover. In some aspects the lugs or pilot are formed by stamping. In some aspects, the cover is formed by stamping. In some aspects, the cover is formed by casting and is made from any castable material known in the art, including but not limited to steel alloys, cast iron, and aluminum. For a cast cover, the lugs and/or pilot can be integrated in the casting. In some aspects, the pump is formed from low carbon steel, for example, to enable the bending of protrusions 114. In some aspects, the pump is formed by stamping.

Figure 12A:
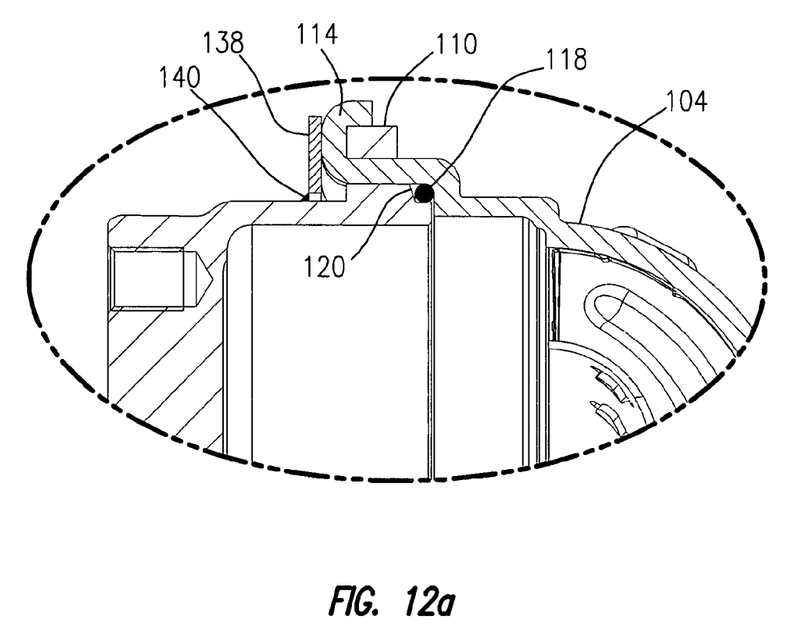
FIG. 12a is a view of section 12a shown in FIG. 11 with a support ring added.

FIG. 12a is a view of section 12a shown in FIG. 11 with support ring 138 added.

Figure 12B:
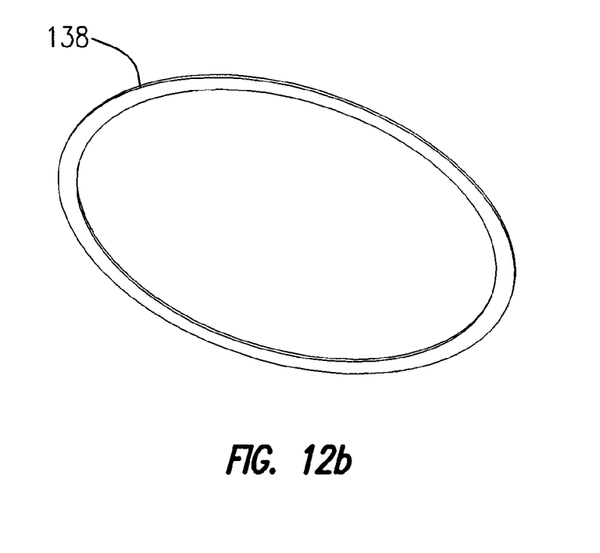

FIG. 12b is a perspective view of support ring 138 shown in FIG. 12a a. The following should be viewed in light of FIGS. 8 through 12b. In some aspects, support, or reinforcing, ring 138 is used to increase the strength of converter 100. For example, ring 138 is circumferentially located about the cover proximate ring 110 and the protrusions and connected to the cover. In some aspects, ring 138 contacts protrusions 114. It should be understood that ring 138 is not limited to any particular size, shape, or configuration. Ring 138 can be attached to cover 102 by any means known in the art, for example, weld 140.

Figure 13A:
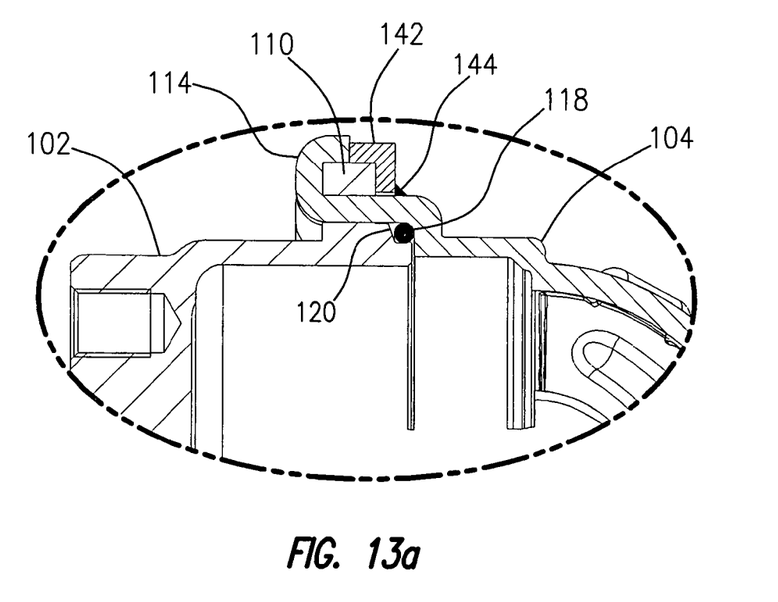

FIG. 13a is a view of section 13a shown in FIG. 8 with support L-ring ring 142 added.

Figure 13B:
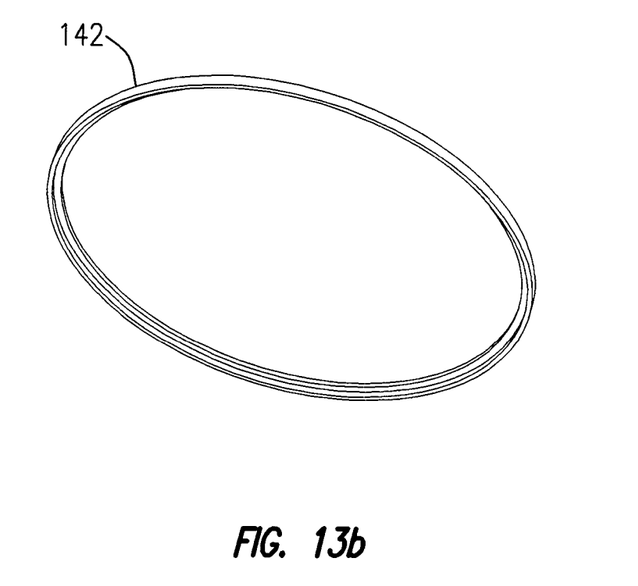

FIG. 13b is a perspective view of support ring 142 shown in FIG. 13a. The following should be viewed in light of FIGS. 8 through 13b. In some aspects, support, or reinforcing, ring 142 is used to increase the strength of converter 100. For example, ring 142 is circumferentially located about the pump proximate ring 110 and protrusions 114. In some aspects, ring 142 contacts ring 110 and protrusions 114. It should be understood that ring 142 is not limited to any particular size, shape, or configuration. Ring 142 can be attached to pump 104 by any means known in the art, for example, weld 144.

In some aspects, (not shown), the configuration of slots and protrusions is reversed from that shown in the figures. For example, the cover has protrusions located about a periphery and the pump has slots located about a periphery. In general, the description of FIGS. 8 through 13a is applicable to the reversed configuration.

In some aspects (not shown), torque converter 100 is balanced by removing material from ring 110. The material can be removed by any means known in the art, including but not limited to drilling, milling, grinding, turning, and cutting. For example, the material can be removed from the ring on the heavy side of the torque converter. The heavy side is the portion of the torque converter which has increased weight and creates imbalance.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter, comprising:
    a cover including:
        a radially outwardly extending portion forming a radially outer periphery of the cover; and,
        a plurality of openings passing through the radially outwardly extending portion; and,
    a pump including a plurality of protrusions extending axially from the radially outer periphery of the cover and disposed within the plurality of openings, wherein
        each opening in the plurality of openings is enclosed by a respective portion of the radially outwardly extending portion radially disposed between said each opening and the radially outer periphery of the cover; and,
        respective portions of the plurality of protrusions are located radially outward of the radially outer periphery of the cover.

2. The torque converter of claim 1 further comprising: a sealing element disposed between said cover and said pump.

3. The torque converter of claim 2 wherein said sealing element is selected from the group consisting of an o-ring and a gasket.

4. The torque converter of claim 1 wherein said plurality of protrusions is bent radially to clamp said pump and said cover.

5. The torque converter of claim 1 wherein said radially outwardly extending portion is integrally formed with said cover.

6. The torque converter of claim 1 further comprising: a support ring circumferentially located about one of said pump or said cover proximate said plurality of protrusions.

7. The torque converter of claim 6 wherein said support ring is in contact with said plurality of protrusions.

8. The torque converter of claim 1 wherein said pump comprises a low carbon steel.

9. The torque converter of claim 1 wherein said pump is formed by stamping.

10. The torque converter of claim 1 wherein said cover is formed by casting.

11. The torque converter of claim 10 wherein said cover is constructed of a material selected from the group consisting of a steel alloy, cast iron, and aluminum.

12. The torque converter of claim 1 wherein said cover is formed by stamping.

13. The torque converter of claim 1 wherein said cover further comprises:
    at least one lug integral to said cover; and,
    a pilot integral to said cover.

14. The torque converter of claim 1 wherein said cover is arranged to receive torque and to transmit said torque through said plurality of protrusions.

15. A method for transferring torque from a drive unit, comprising:
    inserting at least one peripherally disposed protrusion for a pump of a torque converter through at least one peripherally disposed opening in a cover for the torque converter;
    radially bending said at least one protrusion to clamp said cover and said pump;
    axially bending the at least one protrusion such that a portion of the at least one protrusion is radially outward of the cover; and,
    transmitting torque from said cover to said pump through said at least one protrusion, wherein the at least one protrusion extends axially from a radially outwardly facing surface of the pump.

16. A torque converter, comprising:
a cover with a plurality of slots, each slot wholly enclosed by the cover; and,
a pump including a plurality of protrusions, wherein:
  the plurality of protrusions:
    axially extend from a radially outwardly facing surface of the pump; and,
    are disposed in a plurality of openings; and,
  the plurality of protrusions include respective distal ends disposed radially outward of the cover and radially aligned with the cover.

* * * * *